United States Patent
Nonboe et al.

(10) Patent No.: US 11,000,348 B2
(45) Date of Patent: May 11, 2021

(54) MULTIPLE BITE CONFIGURATIONS

(71) Applicant: 3SHAPE A/S, Copenhagen K (DK)

(72) Inventors: Sven Nonboe, Hillerod (DK); Rune Fisker, Virum (DK); Christophe Barthe, Kobenhavn N (DK)

(73) Assignee: 3SHAPE A/S, Copenhagen K (DK)

(*) Notice: Subject to any disclaimer, the term of this patent is extended or adjusted under 35 U.S.C. 154(b) by 446 days.

(21) Appl. No.: 14/436,614

(22) PCT Filed: Oct. 18, 2013

(86) PCT No.: PCT/EP2013/071888
§ 371 (c)(1),
(2) Date: Apr. 17, 2015

(87) PCT Pub. No.: WO2014/060595
PCT Pub. Date: Apr. 24, 2014

(65) Prior Publication Data
US 2016/0166362 A1 Jun. 16, 2016

Related U.S. Application Data

(60) Provisional application No. 61/715,561, filed on Oct. 18, 2012.

(30) Foreign Application Priority Data

Oct. 18, 2012 (DK) .......................... PA 2012 70638

(51) Int. Cl.
*A61C 19/05* (2006.01)
*A61C 7/00* (2006.01)
(Continued)

(52) U.S. Cl.
CPC ................ *A61C 5/77* (2017.02); *A61C 7/002* (2013.01); *A61C 9/004* (2013.01);
(Continued)

(58) Field of Classification Search
CPC ...... A61C 13/0004; A61C 13/34; A61C 19/05; A61C 19/052; A61C 7/002; A61C 9/004
(Continued)

(56) References Cited

U.S. PATENT DOCUMENTS 5,340,309 A * 8/1994 Robertson ............ A61C 19/045
433/215
6,582,229 B1 6/2003 Miller et al.
(Continued)

FOREIGN PATENT DOCUMENTS

CN 101400317 A 4/2009
EP 2 229 914 A1 9/2010
(Continued)

OTHER PUBLICATIONS

International Search Report (PCT/ISA/210) dated Apr. 4, 2014, by the European Patent Office as the International Searching Authority for International Application No. PCT/EP2013/071888.
(Continued)

*Primary Examiner* — Justin C Mikowski
(74) *Attorney, Agent, or Firm* — Buchanan Ingersoll & Rooney P.C.

(57) ABSTRACT

A method of digitally designing a dental component for a patient, wherein the method includes: obtaining a 3D representation of the patient's upper jaw; obtaining a 3D representation of the patient's lower jaw; obtaining at least a first 3D representation of a first bite configuration of the patient's jaws in a first occlusion and a second 3D representation of a second bite configuration of the patient's jaws in a second occlusion different from the first occlusion; digitally determining a occlusal contact movement of the patient's jaws relative to each other based on the at least first 3D representation, the second 3D representation and contact between the patient's upper jaw and lower jaw; and digitally
(Continued)

designing the dental component based on the occlusal contact movement of the patient's jaw relative to each other.

8 Claims, 7 Drawing Sheets

(51) Int. Cl.
*A61C 13/34* (2006.01)
*A61C 5/77* (2017.01)
*A61C 9/00* (2006.01)
*A61C 13/00* (2006.01)

(52) U.S. Cl.
CPC .......... *A61C 13/0004* (2013.01); *A61C 13/34* (2013.01); *A61C 19/05* (2013.01); *A61C 19/052* (2013.01)

(58) Field of Classification Search
USPC .............................................................. 703/1
See application file for complete search history.

(56) References Cited

U.S. PATENT DOCUMENTS

| | | | |
|---|---|---|---|
| 7,452,207 B2* | 11/2008 | Miller | A61C 9/0006 433/71 |
| 7,534,105 B2* | 5/2009 | Arai | A61C 11/022 433/57 |
| 7,835,811 B2* | 11/2010 | Schmitt | A61C 1/084 433/68 |
| 8,234,000 B2* | 7/2012 | Andersson | A61C 9/0006 700/98 |
| 8,359,114 B2* | 1/2013 | Steingart | A61C 1/082 700/182 |
| 8,896,592 B2* | 11/2014 | Boltunov | A61C 7/002 345/419 |
| 9,173,724 B2* | 11/2015 | Moriyama | A61C 13/0004 |
| 2002/0028418 A1* | 3/2002 | Farag | A61C 9/0053 433/29 |
| 2002/0150859 A1* | 10/2002 | Imgrund | G16H 20/30 433/24 |
| 2005/0153257 A1 | 7/2005 | Durbin et al. | |
| 2007/0154868 A1 | 7/2007 | Scharlack et al. | |
| 2007/0207441 A1* | 9/2007 | Lauren | A61C 13/0004 433/213 |
| 2007/0211081 A1* | 9/2007 | Quadling | G09G 5/00 345/632 |
| 2008/0038684 A1 | 2/2008 | Keating et al. | |
| 2011/0276159 A1 | 11/2011 | Chun et al. | |
| 2013/0151208 A1 | 6/2013 | Ito | |

FOREIGN PATENT DOCUMENTS

| | | |
|---|---|---|
| JP | 2000107203 A | 4/2000 |
| JP | 2004 504077 A | 2/2004 |
| JP | 2011-000133 A | 1/2011 |
| JP | 2012 55680 A | 3/2012 |
| WO | WO 01/80761 A2 | 11/2001 |
| WO | WO 01/8070761 A3 | 11/2001 |
| WO | WO 2005/094718 A1 | 10/2005 |
| WO | WO 2005/115266 A3 | 12/2005 |
| WO | WO 20058/115266 A2 | 12/2005 |
| WO | WO 2007/084768 A1 | 7/2007 |
| WO | WO 2011/103876 A1 | 9/2011 |
| WO | WO-2011103876 A1 * | 9/2011 ............. A61C 19/05 |

OTHER PUBLICATIONS

Office Action (Notice of Reasons for Rejection) dated Jul. 4, 2017, by the Japanese Patent Office in corresponding Japanese Patent Application No. 2015-537279, and an English Translation of the Office Action. (6 pages).

Office Action (Notice of Reasons for Rejection) dated Mar. 9, 2018, by the Japanese Patent Office in Japanese Patent Application No. 2015-537279, and an English Translation of the Office Action. (6 pages).

Office Action (Notice of Reasons for Rejection) dated Aug. 20, 2019 by the Japanese Patent Office in corresponding Japanese Patent Application No. 2018-175912, and an English Translation of the Office Action. (9 pages).

Office Action (Notice of Reasons for Rejection) dated Apr. 22, 2020, by the Japanese Patent Office in corresponding Japanese Patent Application No. 2018-175912, and an English Translation of the Office Action. (4 pages).

Besl, P. J., et al."A Method for Registration of 3-D Shapes" IEEE Transactions on Pattern Analysis and Achine Intelligence, vol. 14, No. 2, Feb. 1992, 18 pages.

* cited by examiner

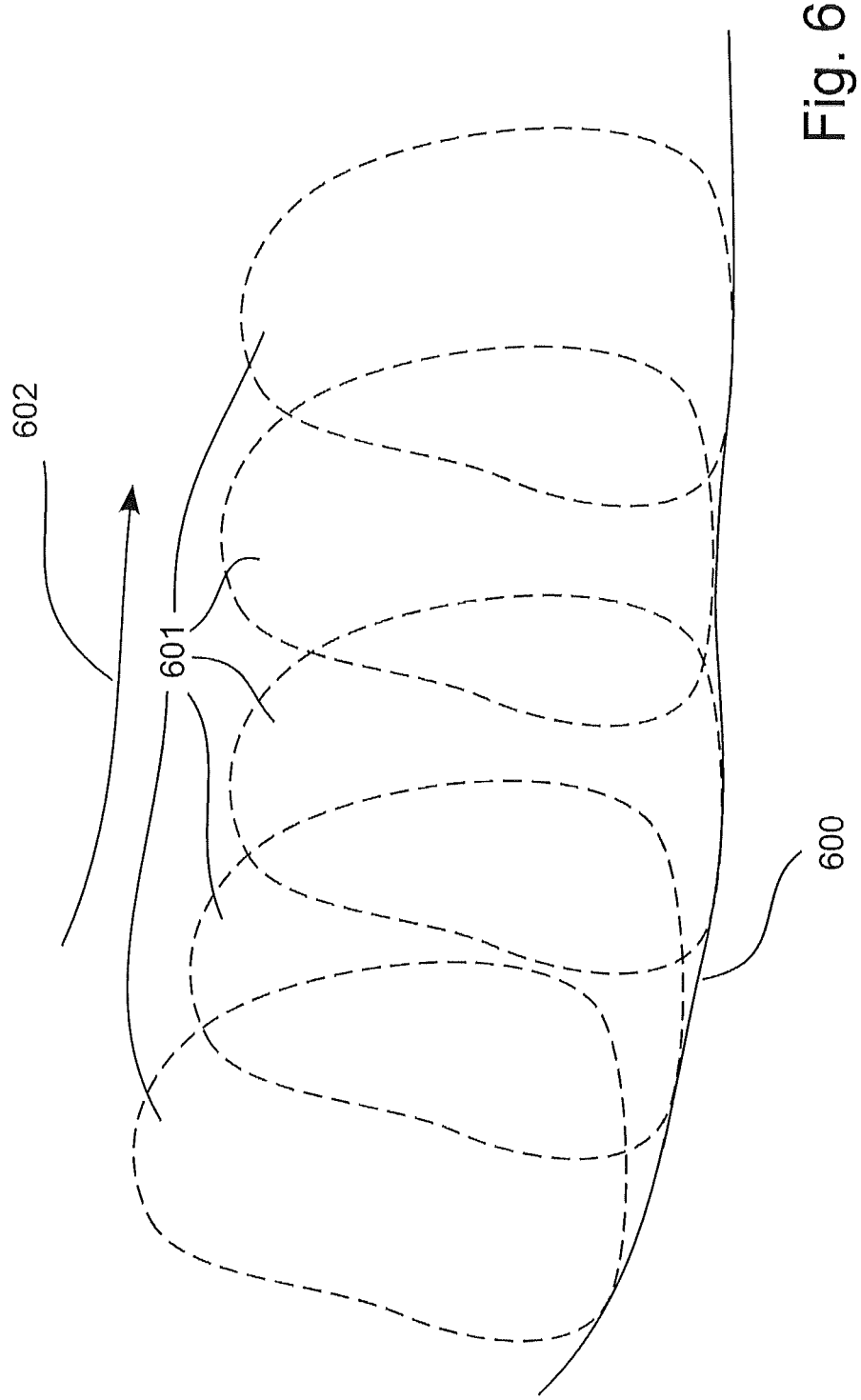

MULTIPLE BITE CONFIGURATIONS

FIELD OF THE INVENTION

This invention generally relates to a system and a method of digitally designing a dental component for a patient. More particularly, the invention relates to designing the dental component by obtaining different bite configurations of the patient's jaws.

BACKGROUND OF THE INVENTION

Within dentistry articulation relates to the movement of the teeth when they come in contact and to the arrangement of artificial teeth to simulate the natural teeth. See for example "Oxford Dictionary of Dentistry", First Edition 2010, ISBN 978-0-19-953301-5:
articulation n. 1. The jointed movement of the upper and lower teeth when they come into contact. 2. The arrangement of artificial teeth to simulate the natural dentition.

And also "Dorland's illustrated medical dictionary", 32$^{nd}$ Edition 2012, ISBN 978-1-4160-6257-8:
articulation [ . . . ] 4. in dentistry: (a) the contact relationship of the occlusal surfaces of the teeth while in action; (b) the arrangement of artificial teeth so as to accommodate the various positions of the mouth and to serve the purpose of the natural teeth that they are to replace.

When designing restorations, such artificial teeth, crowns, bridges, dentures etc. it is important that the articulation is maintained. If the articulation is not correct the patient may experience poor bite function, discomfort and/or pain, moreover, the restoration may crack or break.

It has been very common to use so-called articulators when designing restoration manually. Articulators comes in a variety of models and designs, however, common for them all is that they are used to simulate the articulation. Articulators comprises an upper part on which a model of the maxilla is attached and a lower part on which a model of the mandible is attached. The upper and lower parts are moveable relative to each other within certain restraints. Such restraints, or at least some of them, are in many types of articulators adjustable in order to allow the user to adjust and thereby obtaining a better simulation of the patient's articulation. The adjustable restraints which often are referred to as articulator parameters can be measured and obtained in many different ways. Examples of such articulator parameter is the articulator axis around which the maxilla and mandibular model rotates and where facebows often are used to correctly place the models relative to this axis. Other such parameters can for example be the condylar guidance, the Bennett angle and Bennett shift.

However, with the entry of 3D scanners and 3D printer in dental offices and laboratories designing dental restorations using CAD/CAM software is becoming very common. In many applications virtual articulators have been introduced which simulate physical articulators; moreover, many different methods of how to set and determine virtual articulator parameters are being described.

See for example U.S. Pat. No. 6,582,229 which discloses a method and device for determining an axis of upper and lower jaw articulation of a patient and modeling jaw movement about such an axis, particularly with the use of computerized visual images.

However, the introduction of digital tools such as CAD/CAM software enables for very different ways to determine the articulation. Accordingly, instead of using software to establish articulator parameters in order to simulate articulation in a digital simulation (virtual articulator) of a physical simulator (physical articulator) the current description relates to directly estimate the actual patient specific articulation and movement or a direct simulation thereof using digital tools.

So-called electronic facebows also exists, which are devices attached to the face of the patient and records the movement of the jaw. An example of such an electronic facebow is the JMA system by zebris Dental GmbH which uses ultrasound to record jaw movement However, such electronic facebows are often time consuming to set up, and their only application is to detect jaw motion making them expensive to acquire.

Accordingly, the description further relates to an alternative method of determining patient specific motion which is easy to apply and uses hardware which is used for other purposes and is becoming more and more common in the dental clinics and laboratories.

SUMMARY

Disclosed is a method of designing a dental component for a patient, wherein the method comprises:
  obtaining a 3D representation of the patient's upper jaw;
  obtaining a 3D representation of the patient's lower jaw;
  obtaining at least a first 3D representation of a first bite configuration of the patient's jaws in a first occlusion and a second 3D representation of a second bite configuration of the patient's jaws in a second occlusion different from the first occlusion;
  digitally determining a occlusal contact movement of the patient's jaws relative to each other based on the at least first 3D representation, the second 3D representation and contact between the patient's upper jaw and lower jaw; and
  digitally designing the dental component based on the occlusal contact movement of the patient's jaw relative to each other.

Consequently, it is an advantage that based on the at least two bite configurations it is possible to estimate the physically or spatially possible movements or motions of the patient's jaws.

In particular it is an advantage that the occlusal contact movement is estimated as it is in particular this movement which is relevant to maintain when designing restorations and other dental components in order to avoid pain and discomfort to the patient. The occlusal contact movement can advantageously be recorded. This allows for later playback in order to visualise the movement or use it in order to design the dental component.

The bite configurations do not necessarily need to cover the entire bite of the upper and lower jaws. Advantageously, only part of the actual bite is used for the respective 3D representation of the bite configurations. This saves time and is especially advantageous when using intra-oral scanners. The application of the current method with intra-oral scanner will be discussed further herein.

The respective 3D representations of bite configurations can be used to align the 3D representation of the patient's upper jaw and the 3D representation of the patient's lower jaw. Accordingly, when the occlusal contact movement of the jaws has been determined it can be used to visualize the movement on a monitor.

Such alignment is well known in the art. Typically it is provided by an initial alignment and then followed by optimization, for example by using a ICP (Iterative Closest Point) algorithm. For more information see for example "Method for registration of 3-D shapes" by Paul J. Besl and Neil D. McKay, *Proc. SPIE* 1611, Sensor Fusion IV: Control Paradigms and Data Structures, 586 (Apr. 30, 1992)

In particular, this is advantageously as a dental component, for example a restoration or an orthodontic appliance can be designed based on the determined occlusal contact movement of the upper and lower jaw relative to each other.

This can in one embodiment be done by using the teeth of the 3D representations of the patient jaws as design guides when designing the dental component, since the dental component should be designed so that the determined occlusal contact movement is maintained when the dental component has been inserted in the patient.

For example, during the occlusal contact movement the teeth of the 3D representation of the patient's jaw can be used define a reference, for example by tracing a surface, or limit, which defines a boundary to which the dental component can be designed without affecting the occlusal contact movement, and thus maintaining the patient specific motion even after restorative work. At the same time the occlusal contact movement can be used to design proper contacts and function for the component, such as a dental restoration, by playing the contact movement and adjusting the restoration to ensure proper contact and function for the restoration during motion.

For example the designer can design the dental component so at least one contact area is provided between the dental component and the reference. In this way occlusal contact is achieved for the dental component and an opposing tooth or restoration when inserted into the mouth of the patient. This can be used to design good bite function where the dental components, such as the restoration, support the dynamic occlusion.

In an alternative embodiment the movement itself can be used as a boundary. For example, if the dental component is arranged in the lower jaw the upper jaw can be treated as a solid object which during playing the occlusal contact motion basically cuts or digs away overlapping material from the dental component which prevents the occlusal contact motion from being played correctly. Alternatively, such overlapping material may be identified, e.g. marking it in a red color, whereby it is up to the designer to decide whether the area should be removed or redesigned.

As implied by the wording the occlusal contact movement is the movement of the jaws where at least one area of contact between the teeth of the upper jaw (maxilla) and the teeth of the lower jaw (mandible) is maintained. This is often also referred to as the dynamic occlusion.

More than two different bite configurations may be required in order to determine or estimate the occlusal contact movement of the patient's jaws relative to each other, such as three, four, five, six, seven, eight, nine, ten etc.

The bite configurations can be recorded using an intra oral 3D scanner, such as 3Shape's TRIOS scanner. The dentist will ask the patient to bite his or her upper jaw and lower jaw together, and while the patient bites together in a first configuration, the dentist will perform a scanning of the patient's teeth by means of the intra oral scanner to acquire a first 3D representation. Then the dentist will ask the patient to bite his or her upper jaw and lower jaw together again, and while the patient bites together in a second configuration, the dentist will perform a scanning of the patient's teeth by means of the intra oral scanner to acquire a second 3D representation. If more bite configurations are desired or required for determining the occlusal contact movement of the jaws relative to each other, the dentist will ask the patient to bite together a third, fourth, fifth etc. time and perform a scanning for each bite.

In one embodiment digitally determining the occlusal contact movement comprises a consecutive sequence of at least two 3D representations of bite configurations of the patient's jaws in respective occlusions.

By taking such a sequence of bite configurations in a consecutive sequence it is possible to obtain the true motion directly without any estimation or interpolation between bite configurations.

Such a sequence of bite configurations can for example be obtained by holding a scanner, such as the TRIOS scanner described above, against the teeth of the patient while the patient is moving the jaws in an occlusal contact movement. The TRIOS is then set to record a sequence of 3D scans during the occlusal contact movement. Each 3D scan can then be used to align the maxilla and mandible, whereafter the maxilla and mandible can be displayed in their respective alignment in a sequence corresponding to the sequence wherein the bite configurations were obtained during the recorded sequence of 3D scans.

Accordingly, in some embodiments the method comprises obtaining a plurality of 3D representations of bite configurations of the patient's jaw using an intra-oral scanner.

This is in particular advantageous in embodiments as previously described where the plurality of 3D representations of bite configurations are recorded as consecutive sequence of frames. The frames can for example be used to generate an animation showing the movement of jaws. The frame can advantageously be a 3D frame, ie. where the upper and lower jaws has been aligned with their respective bite configurations, whereby the 3D representations of the upper and lower jaw can be rotated. However, the frames can alternatively be a 2D image.

In particular, in one embodiment, the plurality or consecutive sequence of 3D representations of bite configurations can be used to directly determine the occlusal contact motion if they are taken with an interval sufficiently short for generating an occlusal contact motion with a resolution which is high enough for a given application.

Accordingly, the occlusal contact movement of the 3D representations are adapted to be played as a video stream.

Moreover, in one embodiment when the occlusal contact movement is played, e.g. by showing the upper and lower jaws moving with respect to each other in a virtual environment, the speed can be altered for example showing it in slow motion.

As understood above and as will be further clarified the method as described herein is thus particularly advantageously used together with an intra-oral scanner as this can obtain the 3D representation of the jaws and the bite registrations. Moreover, the intra-oral scanner is used by the dentist or dental technician for many other purposes and is thus an instrument which is becoming very versatile in its use.

The bite configurations can also be obtained by means of the dentist taking a physical impression, using impression material, in the patient's mouth for each different bites configuration. The impressions should then be scanned in for example a 3D desktop scanner afterwards to obtain the 3D representations of the different bite configurations.

The method of digitally designing the dental component will typically be performed by a dental technician using a software CAD program running on a computer, such as 3Shape's Dental System CAD software. The dental technician will typically obtain the different 3D representations, i.e. of the patient's upper jaw, lower jaw, first bite configuration and second bite configuration, as computer files, and these files can then be loaded into the software program, such that the occlusal contact movement of the patient's jaws can be digitally determined, either automatically by the software program or by the dental technician. The dental technician can then design the dental component, or the component can be automatically designed by the software program.

The different 3D representations can be obtained as computer files from the dentist, if the dentist has performed the scanning using an intra oral 3D scanner. If physical impressions were made, then the impressions can be scanned by the dental technician him/herself in the dental laboratory, and the 3D representations obtained by the scanning can then be obtained as computer files and loaded into the computer for use in the software CAD program.

The method may be a computer-implemented method.

In some embodiments digitally determining occlusal contact movement of the patient's jaws relative to each other comprises interpolating the movement between the measured bite configurations.

In one embodiment the interpolation is a linear interpolation of the position and rotation/angles of the jaws over a number of steps. The number of steps can be decided based on the numbers and/or distance between the 3D representations of the bite registrations. A higher number of steps will result in an occlusal contact movement with a higher resolution, however, more processing power is necessary.

In some embodiments the interpolation comprises performing a rigid transformation.

In some embodiments the interpolation comprises performing a linear transformation.

In some embodiments the interpolation comprises performing a non-linear transformation.

In some embodiments the interpolation is a combination of linear and non-linear transformations.

In some embodiments the transformation comprises translation and rotation.

In some embodiments the interpolation is performed with regard to teeth present within the range of known data points from at least the first and the second bite configurations.

If a tooth is present along the path of the interpolation, then the interpolation will be a non-linear translations and/or rotation. In other words, if it during interpolation is detected that teeth will collide, i.e. those areas of the 3D representations will overlap which would be impossible in the physical world, then interpolation will move the jaws so that the overlap is avoided in order to ensure proper contact.

Accordingly, in one embodiment the method further comprises
  detecting overlapping areas of the teeth of the 3D representation of the patient's upper jaw and the 3D representation of the patient's lower jaw during interpolation, and
  moving the 3D representation of the patient's upper jaw and the 3D representation of the patient's lower jaw apart until no overlapping areas are detected.

Taking overlapping areas into consideration when interpolating provides an even better estimation of the occlusal contact motion, and consequently a better fit of the designed dental component.

In a similar manner then it can be detect whether there is no occlusal contact at all between the 3D representations of the jaws during interpolation.

Accordingly, in one embodiment the method further comprises
  detecting no areas of contact between the teeth of the 3D representation of the patient's upper jaw and the 3D representation of the patient's lower jaw during interpolation, and
  moving the 3D representation of the patient's upper jaw and the 3D representation of the patient's lower jaw together until at least one area of contact is detected.

Moving the respective jaws apart or together/towards each other can be done linearly. However, the jaws can also be closed (moved together) or opened (moved apart) along a rotational movement. This can be done around a default rotation axis set by the system or the user. However, it can also be done based on a physical/biological model in order to obtain even higher accuracy in the determined occlusal contact movement.

In some embodiments the occlusal contact movement of the patient's jaws comprise:
  protrusion;
  retrusion;
  laterotrusion;
  latero-re surtrusion;
  mediotrusion; and/or
  immediate side shift.

In one embodiment the occlusal contact motion is played in the order it was determined. E.g. if the occlusal contact motion was determined by first taking lateral 3D representations of bite registrations, followed by 3D representation of bite registration taken during protrusion and finally 3D representations of bite registrations taken during retrusion, the occlusal contact motion will be played in that same sequence. This increases the accuracy of the occlusal contact motion since the motion may be slightly different if played the other way around due to anatomy such as muscle movement, jaw configuration etc.

However, in some embodiments the risk of losing the higher accuracy may be acceptable in exchange of being able to play the occlusal contact movement in any order and direction.

In some embodiments determining the occlusal contact movement of the patient's jaws comprises determining the extreme positions of the movements of the jaws.

In some embodiments at least one of the 3D representations provides constraints for the occlusal contact movement of the patient's jaws.

In some embodiments the method comprises indicating which articulations/movements of the jaws which are due to recorded bite configurations and which articulations/movements of the jaws that are due to the determined occlusal contact movement.

In some embodiments the bite configurations comprise:
  a closed bite with contact between at least some of the upper and lower teeth;
  a wry/skew bite to the left side;
  a wry/skew bite to the right side; and/or
  a bite where teeth and jaws are in static occlusion.

In some embodiments the bite configurations comprise one or more interocclusal records, where the interocclusal records comprise:
  centric relation and/or maximum intercuspation;
  right lateral;
  left lateral; and/or
  protrusive.

In some embodiments at least one of the bite configurations comprises an extreme position of the movements of the jaws.

In some embodiments the bite configurations comprise:
  the maximum laterotrusion;

the maximum mediotrusion;
the maximum immediate side shift;
the maximum latero-re-surtrusion;
the maximum protrusion of the patient; and/or
the maximum retrusion of the patient.

In some embodiments the dental component is designed for the patient based on the determined occlusal contact movement of the patient's jaws.

In some embodiments the method comprises that during designing of the dental component an operator has the option to shift between viewing/visualizing the articulations/movements of the jaws which are due to recorded bite configurations.

In some embodiments the dental component is a dental restoration or an orthodontics appliance.

In some embodiments the dental restoration is a crown, an abutment, a bridge, a full denture, a partial removable denture, an inlay, an onlay etc.

In some embodiments the orthodontic appliance is a brace, an aligner, a retainer etc.

In some embodiments the 3D representations are obtained by means of scanning the patient's teeth intra-orally and/or by means of scanning physical impressions of the patient's teeth and/or by means of scanning physical models of the patient's teeth.

In some embodiments the 3D representation is obtained by means of obtaining a 3D scan.

In some embodiments the 3D scan is an intra oral scan of at least part of the patient's set of teeth, a scan of at least part of an impression of the patient's set of teeth, and/or a scan of at least part of a physical model of the patient's set of teeth.

In some embodiments the 3D scan is performed by means of laser light scanning, LED scanning, white light scanning, fluorescence scanning, probe-scanning, X-ray scanning, and/or CT scanning.

In particular, disclosed herein is a system for designing a dental component for a patient, wherein the system comprises:
  means for obtaining a 3D representation of the patient's upper jaw;
  means for obtaining a 3D representation of the patient's lower jaw;
  means for obtaining at least a first 3D representation of a first bite configuration of the patient's jaws in a first occlusion and a second 3D representation of a second bite configuration of the patient's jaws in a second occlusion different from the first occlusion;
  means for digitally determining occlusal contact movement of the patient's jaws relative to each other based on the at least first 3D representation, the second 3D representation and contact between the patients' upper jaw and lower jaw; and
  means for digitally designing the dental component based on the occlusal contact movement of the patient's jaw relative to each other.

Furthermore, the invention relates to a computer program product comprising program code means for causing a data processing system to perform the method according to any of the embodiments, when said program code means are executed on the data processing system, and a computer program product, comprising a computer-readable medium having stored there on the program code means.

Furthermore, the invention relates to a nontransitory computer readable medium storing thereon a computer program, where said computer program is configured for causing computer-assisted digitally designing of a dental component for a patient, comprising:
  obtaining a 3D representation of the patient's upper jaw;
  obtaining a 3D representation of the patient's lower jaw;
  obtaining at least a first 3D representation of a first bite configuration of the patient's jaws in a first occlusion and a second 3D representation of a second bite configuration of the patient's jaws in a second occlusion different from the first occlusion;
  digitally determining a occlusal contact movement of the patient's jaws relative to each other based on the at least first 3D representation, the second 3D representation and contact between the patient's upper jaw and lower jaw; and
  digitally designing the dental component based on the occlusal contact movement of the patient's jaw relative to each other.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 6 shows an embodiment of how the occlusal contact motion is used to design a dental component, such as a restoration.

DETAILED DESCRIPTION

In the following description, reference is made to the accompanying figures, which show by way of illustration how the invention may be practiced.

Figure 1:
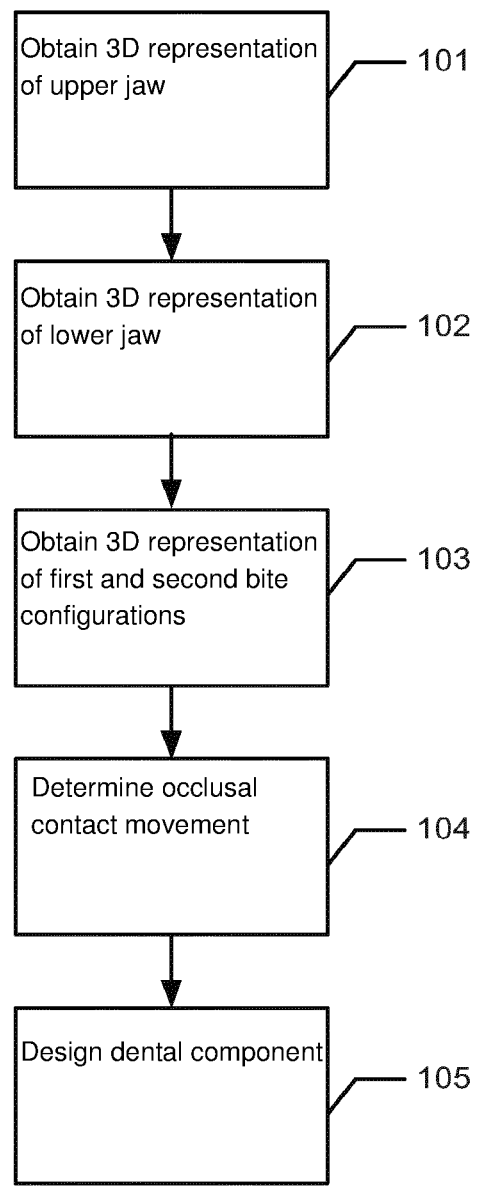
FIG. 1 shows an example of a flowchart of a method of digitally designing a dental component for a patient.

FIG. 1 shows an example of a flowchart of a method of digitally designing a dental component for a patient.

In step 101 a 3D representation of the patient's upper jaw is obtained.

In step 102 a 3D representation of the patient's lower jaw is obtained.

In step 103 at least a first 3D representation of a first bite configuration of the patient's jaws and a second 3D representation of a second bite configuration of the patient's jaws are obtained.

In step 104 occlusal contact movement of the patient's jaws relative to each other is digitally determined based on the at least first 3D representation and second 3D representation.

In step 105 the dental component is digitally designed based on the occlusal contact movement of the patient's jaw relative to each other.

FIG. 2 shows examples of different bite configurations.

Figure 2A:
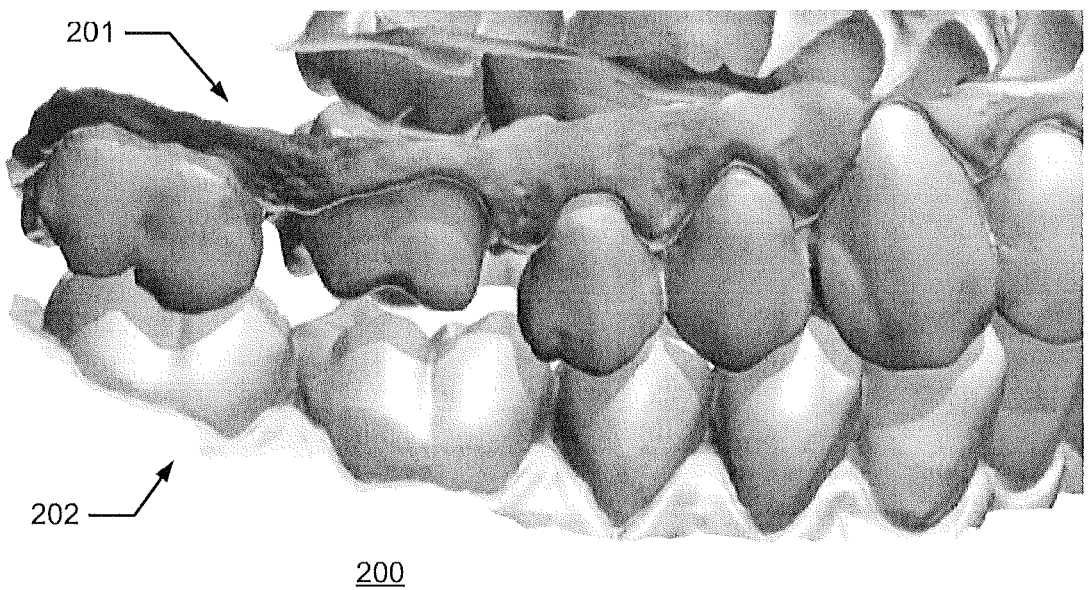
FIG. 2 shows examples of different bite configurations.

FIG. 2a) shows a bite configuration 200 where the patient's upper jaw 201 and lower jaw 202 are in static occlusion.

Figure 2B:
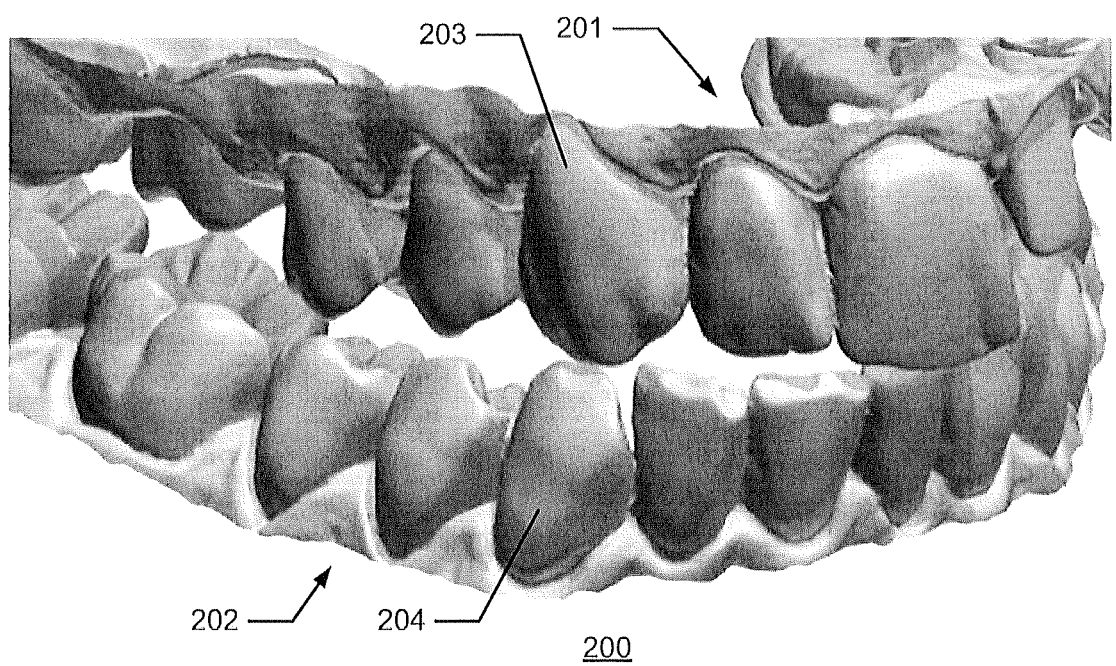

FIG. 2b) shows a bite configuration 200 where the canine 203 in the right side of the patient's upper jaw 201 is in contact with the canine 204 in the right side of the patient's lower jaw 202.

Figure 2C:
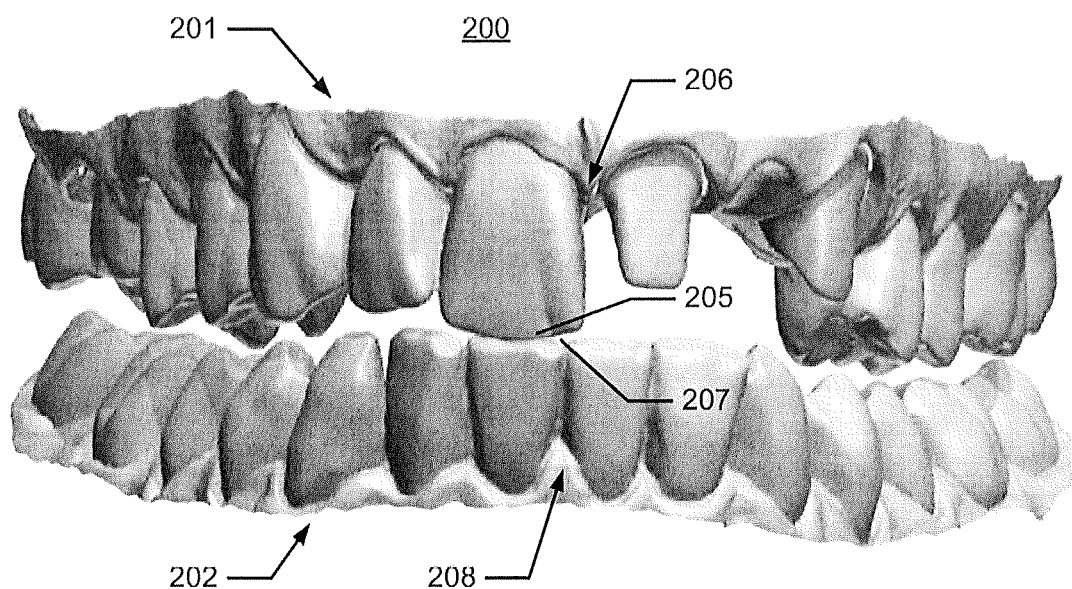

FIG. 2c) shows a bite configuration 200 where the incisal edge 205 of anterior teeth 206 in the upper jaw 201 is in contact with the incisal edge 207 of the anterior teeth 208 in the lower jaw 202.

Figure 2D:
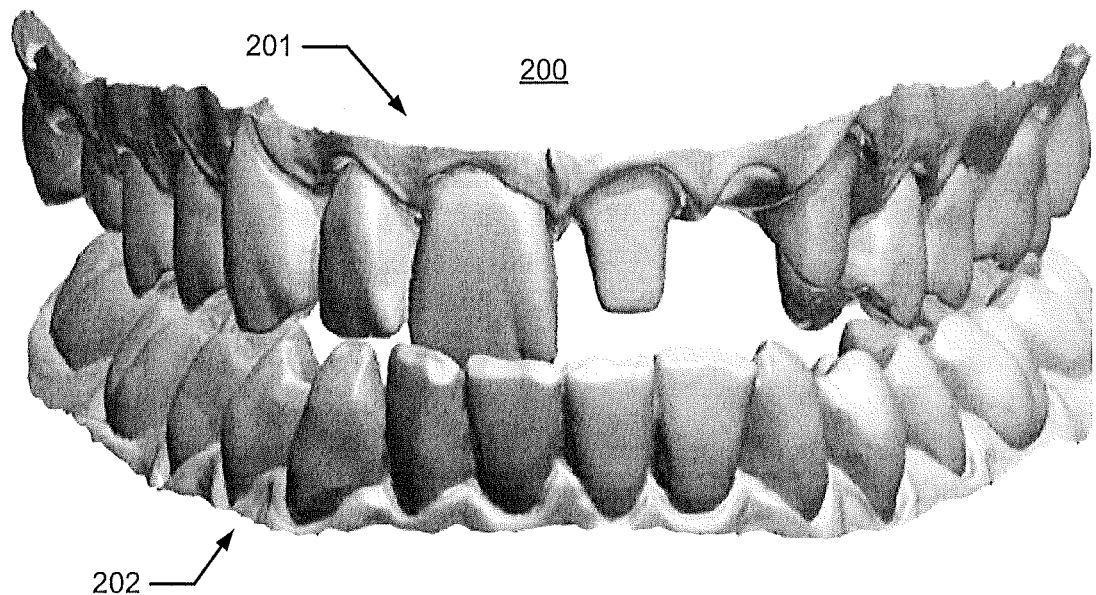

FIG. 2d) shows a bite configuration 200 with a furthest protrusion and some laterotrusion of the jaws 201, 202.

Figure 2E:
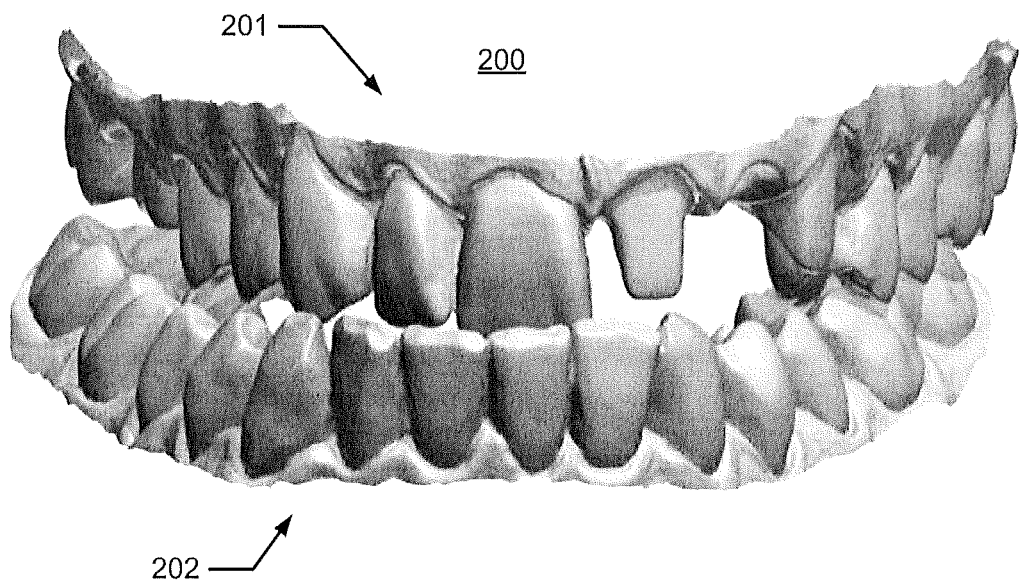

FIG. 2e) shows a bite configuration 200 also with a furthest protrusion and some laterotrusion of the jaws 201, 202, but where the laterotrusion is different from FIG. 2d).

Figure 2F:
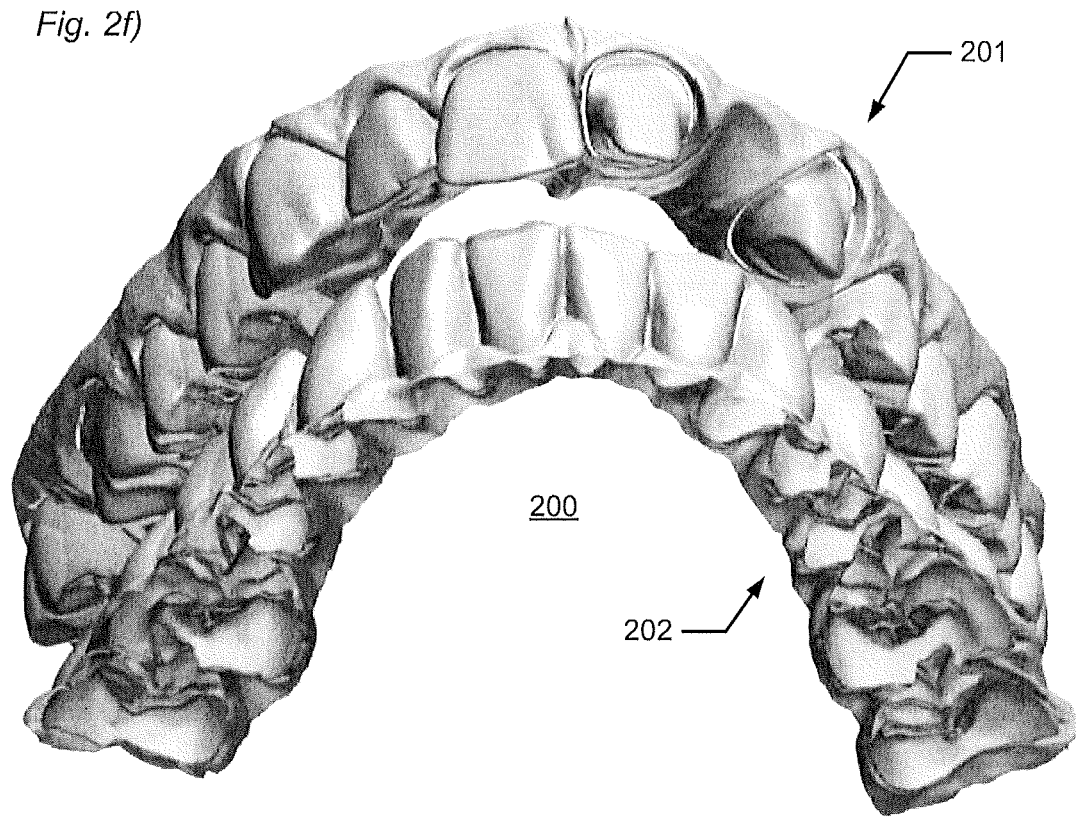

FIG. 2f) shows a bite configuration 200 with strong retrusion of the jaws 201, 202.

Figure 3:
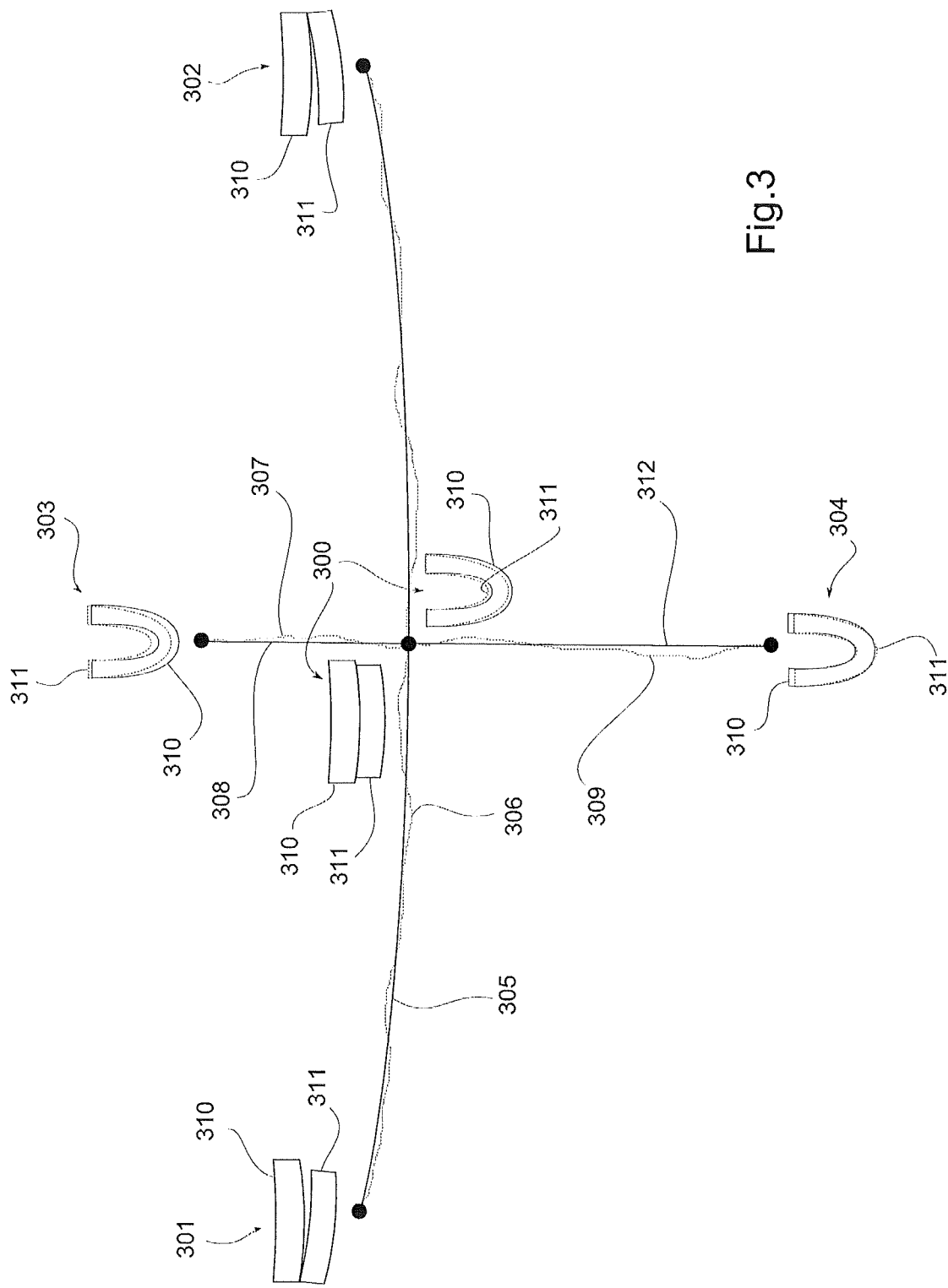
FIG. 3 shows an embodiment of the invention wherein the occlusal contact movement is determined by using interpolation.

FIG. 3 shows schematically an embodiment where five 3D representations of different bite configurations 300, 301, 302, 303, 304 in respective occlusions have been obtained and the movement of the patient's jaws relative to each other is determined by interpolation between these.

Keep in mind, in particular when reading the description with respect to FIGS. 3, 4 and 5, that when discussing movement direction, in particular right and left, it is with respect to the patient. However, the images are presented as an observer facing the patient. Accordingly, what is left for the patient will be right for the observer and vice versa.

The movement determined in this embodiment is the natural chewing movement of the patient. Although a higher number of bite configurations will allow for the movement to be determined with higher accuracy to the natural movement it is possible to obtain it reasonably with as few as five bite configurations.

The bite configuration where the maxilla 310 and the mandible 311 are in centric occlusion 300 is obtained. This is the natural bite of the patient. Typically, this is also the position where the teeth are in maximal occlusal contact.

The sideward movement of the jaw when in occlusion can be determined by using the centric occlusion together with a left sideward bite configuration 302 wherein the mandible of the patient is moved to the left and a right sideward bite configuration 301 wherein the mandible of the patient is moved to the right.

The sideward movement is then determined by interpolating between the right sideward bite configuration 301 and the central occlusion 300, and between the central occlusion 300 and the left sideward bite configuration 302.

The interpolation may be linear; however, typically the movement of the dental arches defines a curved movement. Accordingly, the sideward movement may be determined by interpolating along a curved sideward line 305. The interpolation paths/curves 305, 308, 312 preferably define an average movement derived from typical jaw movements of patients.

As the system interpolates it may check for occlusal contact between the teeth of the mandible and the maxilla. If the system finds that the teeth of the maxilla and mandible would overlap if moved along the sideward line then it open the jaws so that the teeth maintain contact but do no overlap. Similarly, if the system finds that there are no contacts between the teeth, e.g. the jaw is open, it would close the maxilla and the mandible together until contact occurs. This will be illustrated further in FIGS. 4a-4c and 5a-5c.

The opening and closing of the jaws may be a linear movement, however, it may also be a rotation around a default axis. The default axis can be set as default by the computer, set by the user or determined otherwise.

Thus, as the system interpolates between the bite configurations along curved sideward line 305 while maintaining occlusal contact the sideward movement 306 is determined.

In a similar manner the retrusion 307, which is the backwards movement from the centric occlusion to a back bite configuration 303 where the mandible is retracted can be determined by interpolating as described above along a retrusion curve 308.

And in yet another similar fashion the protrusion 309, which is the forward motion of the mandible relative to maxilla from the centric occlusion to a front bite configuration 304 can also be determined by interpolating as described along a protrusion curve 312.

As can be understood the determined occlusal movements, whether it be lateral, retrusive or protrusive, may deviate from the interpolation lines. However, they will go through the respective points representing each 3D representation of a bite configuration since these are well known position.

For improved accuracy further 3D representations of bite configurations may be obtained, which also has been mentioned earlier.

With respect to FIGS. 4 and 5 it will be even further discussed how the method takes overlaps and gaps into consideration during interpolation.

Figure 4A:
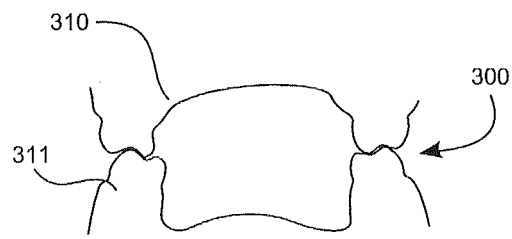
FIGS. 4 and 5 illustrates further how to correct for tooth collision and gaps during interpolation in one embodiment of the invention.

FIG. 4a show the 3D representation of a bite configuration where the 3D representation of the patient's upper jaw 310 and the 3D representation of the patient's lower jaw 311 are in centric occlusion 300.

Figure 4B:
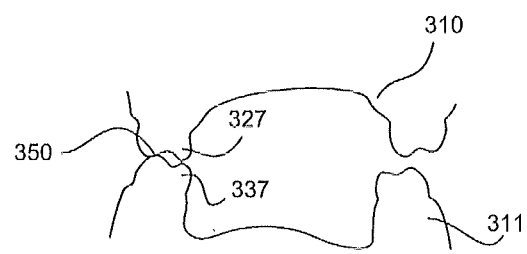

FIG. 4b shows the actual patient specific movement, where the lower jaw 311 is moved in a right lateral direction as indicated by the arrow. FIG. 4b shows a configuration of the upper and lower jaw during lateral movement between the central occlusion and the right sideward bite configuration 301. The movement is done while keeping at least one contact point between the teeth of the upper and lower jaw. The contact points may not necessarily be present in the shown cross-section, but may occur between other teeth in the first 3D teeth model. However, in the current case a contact point 350 is present between two molars 337 and 327.

Figure 4C:
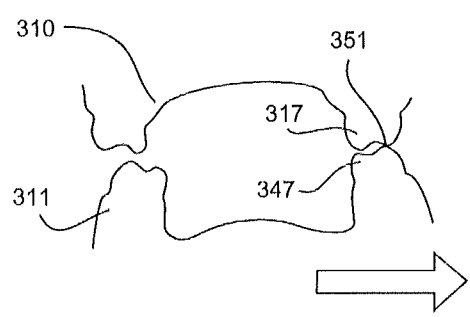

Subsequently the lower jaw 311 is moved in the left lateral direction from the centric occlusion 300 as shown in FIG. 4c toward the left sideward bite configuration 302. Similar to FIG. 4b FIG. 4c shows a relative position of the upper and lower jaw where a contact point 351 is present between the two molars 317 and 347.

FIGS. 4a, 4b and 4c shows representative relative positions of the upper and lower jaw during the actual patient specific movement. Other such sectioning views could be made in other areas at other points during the lateral movement or even during other movement, such as protrusion or retrusion.

Figure 5A:
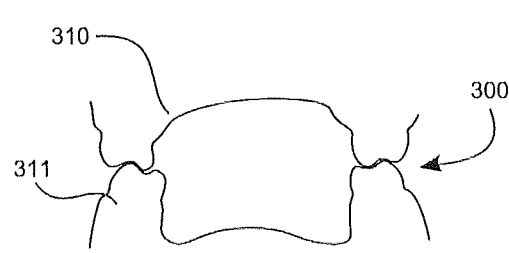
Figure 5B:
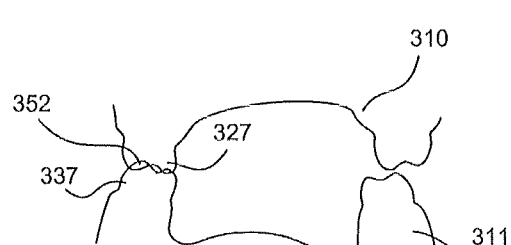
Figure 5C:
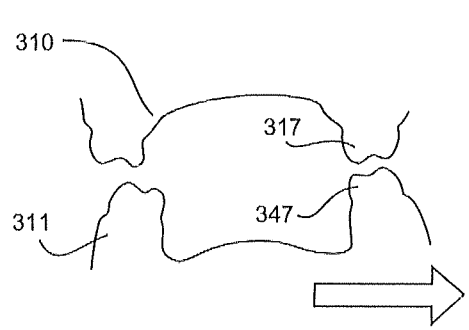

However, as will be shown in FIGS. 5a, 5b and 5c correction may be necessary when determining the patient specific movement, i.e. the occlusal contact movement, using interpolation.

FIG. 5a shows the bite configuration wherein the upper and lower jaw are in centric occlusion 300. This is identical to FIG. 4a as it was recorded in that position.

However, when interpolating between the centric occlusion bite configuration and the right sideward bite configuration 301 an overlap 352 is detected between at the molars 327 and 337, as shown in FIG. 5b which corresponds to the position shown in FIG. 4b. Accordingly in order to compensate for this the jaws are moved apart until the overlapping area is gone, but only so far that an occlusal contact still exists.

Similarly as shown in FIG. 5c, which corresponds to the position in FIG. 4c, the interpolation results in no contact being present between the upper and lower jaw. Accordingly, the jaws are moved together until occlusal contact is obtained, although not as far so that the 3D representations overlap.

With respect to FIG. 6 it is described how the occlusal contact movement can be used to design the dental component. A trace surface 600 is generated by tracing the cusps of a tooth 601 of the first 3D teeth model as it follows the occlusal contact movement 602.

The trace surface can then be used as a reference for designing the dental component. For example the trace surface 600 may be used as a cutting surface for cutting the dental component if it penetrates the trace surface and thus would block the actual patient specific occlusal contact movement to be performed by the patient.

Although shown only using one tooth 601 in FIG. 5, the trace surface is typically a sum of the trace lines or surfaces of each tooth in the respective jaws.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

Embodiments

The following sequence of embodiment should not be read limiting for the invention, but should be seen as a sequence of advantageous embodiments and examples.

1. A method of designing a dental component for a patient, wherein the method comprises:
    obtaining a 3D representation of the patient's upper jaw;
    obtaining a 3D representation of the patient's lower jaw;
    obtaining at least a first 3D representation of a first bite configuration of the patient's jaws in a first occlusion and a second 3D representation of a second bite configuration of the patient's jaws in a second occlusion different from the first occlusion;
    digitally determining a occlusal contact movement of the patient's jaws relative to each other based on the at least first 3D representation, the second 3D representation and contact between the patient's upper jaw and lower jaw; and
    digitally designing the dental component based on the occlusal contact movement of the patient's jaw relative to each other.

2. A method according to embodiment 1, wherein digitally determining the occlusal contact movement comprises a consecutive sequence of at least two 3D representations of bite configurations of the patient's jaws in respective occlusions.

3. The method according to claim 2, wherein the method further comprises obtaining the consecutive sequence of at least two 3D representations of bite configurations of the patient's jaws in respective occlusions using an intra-oral scanner.

4. The method according to claim 2 or 3, wherein the method further comprises that the 3D representations of bite configurations are recorded as a consecutive sequence of frames.

5. The method according to embodiment 2, 3 or 4, wherein the method comprises obtaining a plurality of 3D representations of bite configurations of the patient's jaw, and where the 3D representations are adapted to be played as a video stream.

6. A method according to embodiment 1, wherein digitally determining the occlusal contact movement of the patient's jaws relative to each other comprises interpolating the movement between the measured bite configurations.

7. The method according to embodiment 6, wherein digitally determining occlusal contact movement of the patient's jaws relative to each other comprises interpolating the movement between the measured bite configurations.

8. The method according to embodiment 6 or 7, wherein the interpolation comprises performing a rigid transformation.

9. The method according to embodiment 6, 7 or 8, wherein the interpolation comprises performing a linear transformation.

10. The method according to embodiment 6, 7 or 8, wherein the interpolation comprises performing a non-linear transformation.

11. The method according to embodiment 6, 7 or 8, wherein the interpolation is a combination of linear and non-linear transformations.

12. The method according to any one of the embodiments 6-11, wherein the transformation comprises translation and rotation.

13. The method according to any one of the embodiments 6-12, wherein the interpolation is performed with regard to teeth present within the range of known data points from at least the first and the second bite configurations.

14. The method according to any one of the embodiments 6-13, wherein the method further comprises
    detecting overlapping areas of the teeth of the 3D representation of the patient's upper jaw and the 3D representation of the patient's lower jaw during interpolation, and
    moving the 3D representation of the patient's upper jaw and the 3D representation of the patient's lower jaw apart until no overlapping areas are detected.

15. The method according to any one of the embodiments 1-14, wherein the method further comprises obtaining a third 3D representation of a third bite configuration of the patient's jaws.

16. The method according to any one of the embodiments 1-15, wherein the method comprises digitally aligning at least the 3D representation of the upper jaw, the 3D representation of the lower jaw, the first 3D representation of the first bite configuration and the second 3D representation of the second bite configuration.

17. The method according to any one of the embodiments 1-16, wherein the occlusal contact movement of the patient's jaws comprise:
   protrusion;
   retrusion;
   laterotrusion;
   latero-re surtrusion;
   mediotrusion; and/or
   immediate side shift.

18. The method according to any one of the embodiments 1-17, wherein determining the occlusal contact movement of the patient's jaws comprises determining the extreme positions of the movements of the jaws.

19. The method according to any one of the embodiments 1-18, wherein at least one of the 3D representations provides constraints for the occlusal contact movement of the patient's jaws.

20. The method according to any one of the embodiments 1-19, wherein the method comprises indicating which movements of the jaws which are due to recorded bite configurations and which movements of the jaws that are due to the determined occlusal contact movement.

21. The method according to any one of the claims 1-20, wherein the occlusal contact motion is played in the order it was determined.

22. The method according to any one of the embodiments 1-21, wherein the bite configurations comprise:
   a closed bite with contact between at least some of the upper and lower teeth;
   a wry/skew bite to the left side;
   a wry/skew bite to the right side and/or
      a bite where teeth and jaws are in static occlusion.

23. The method according to any one of the embodiments 1-22, wherein the bite configurations comprise one or more interocclusal records, where the interocclusal records comprise:
   centric relation and/or maximum intercuspation;
   right lateral;
   left lateral; and/or
   protrusive.

24. The method according to any one of the embodiments 1-23, wherein at least one of the bite configurations comprises an extreme position of the movements of the jaws.

25. The method according to any one of the embodiments 1-24, wherein the bite configurations comprise:
   the maximum laterotrusion;
   the maximum mediotrusion;
   the maximum immediate side shift;
   the maximum latero-re-surtrusion;
   the maximum protrusion of the patient; and/or
   the maximum retrusion of the patient.

26. The method according to any one of the embodiments 1-25, wherein the dental component is designed for the patient based on the determined occlusal contact movement of the patient's jaws.

27. The method according to any one of the embodiments 1-26, wherein the method comprises that during designing of the dental component an operator has the option to shift between viewing/visualizing the articulations/movements of the jaws which are due to recorded bite configurations.

28. The method according to any one of the embodiments 1-27, wherein the dental component is a dental restoration or an orthodontics appliance.

29. The method according to any one of the embodiments 1-28, wherein the dental restoration is a crown, an abutment, a bridge, a full denture, a partial removable denture, an inlay, an onlay etc.

30. The method according to any one of the embodiments 1-29, wherein the orthodontic appliance is a brace, an aligner, a retainer etc.

31. The method according to any one of the embodiments 1-30, wherein the 3D representations are obtained by means of scanning the patient's teeth intra-orally and/or by means of scanning physical impressions of the patient's teeth and/or by means of scanning physical models of the patient's teeth.

32. The method according to any one of the embodiments 1-31, wherein the 3D representation is obtained by means of obtaining a 3D scan.

33. The method according to any one of the embodiments 1-32, wherein the 3D scan is an intra oral scan of at least part of the patient's set of teeth, a scan of at least part of an impression of the patient's set of teeth, and/or a scan of at least part of a physical model of the patient's set of teeth.

34. The method according to any one of the embodiments 1-33, wherein the 3D scan is performed by means of laser light scanning, LED scanning, white light scanning, fluorescence scanning, probe-scanning, X-ray scanning, and/or CT scanning.

35. The method according to any one of the claims 1-34, wherein the occlusal contact motion defines a reference which is used as a design guide when designing the dental component.

36. The method according to claim 35, wherein the at least one contact surface is provided between the dental component and the reference 37. The method according to claim 35 or 36, wherein the occlusal contact motion defines a trace surface which as a design guide when designing the dental component.

38. The method according to claim 37, wherein the trace surface is used as a cutting plane for trimming the dental component.

39. The method according to claim 37, wherein at least a part of the dental component is snapped to the trace surface.

40. A computer program product comprising program code means for causing a data processing system to perform the method of any one of the preceding claims, when said program code means are executed on the data processing system.

41. A computer program product according to the previous embodiment, comprising a computer-readable medium having stored there on the program code means.

42. A nontransitory computer readable medium storing thereon a computer program, where said computer program is configured for causing computer-assisted digitally designing of a dental component for a patient by performing the method of any one or more of the preceding claims.

43. A system for designing a dental component for a patient, wherein the system comprises:
   means for obtaining a 3D representation of the patient's upper jaw;
   means for obtaining a 3D representation of the patient's lower jaw;
   means for obtaining at least a first 3D representation of a first bite configuration of the patient's jaws in a first occlusion and a second 3D representation of a second bite configuration of the patient's jaws in a second occlusion different from the first occlusion;
   means for digitally determining a occlusal contact movement of the patient's jaws relative to each other based on the at least first 3D representation, the second 3D representation and contact between the patient's upper jaw and lower jaw; and means for digitally designing the dental component based on the occlusal contact movement of the patient's jaw relative to each other.

The invention claimed is:

1. A method of designing a dental restoration or an orthodontic appliance for a patient, wherein the method comprises:
   obtaining a 3D representation of the patient's upper jaw using an intra-oral scanner;
   obtaining a 3D representation of the patient's lower jaw using the intra-oral scanner;
   obtaining a consecutive sequence of at least a first 3D representation of a first bite configuration of the patient's jaws in a first occlusion and a second 3D representation of a second bite configuration of the patient's jaws in a second occlusion different from the first occlusion by recording an occlusal contact movement of the patient using the intral-oral scanner while the patient is moving the jaws in the occlusal contact movement;
   digitally obtaining an alignment sequence of the upper jaw and the lower jaw by aligning the 3D representation of the 3D representation of the upper jaw and the 3D representation of the lower jaw in the consecutive sequence by using the respective first and second 3D representations of the first and second bite configurations;
   digitally determining the occlusal contact movement of the patient's upper jaw and lower jaw relative to each; and
   digitally designing the dental restoration or the orthodontic appliance based on the occlusal contact movement of the patient's upper jaw and lower jaw relative to each other.

2. The method according to claim 1, wherein the occlusal contact movement defines a reference which is used as a design guide when designing the dental component.

3. The method according to claim 2, wherein the at least one contact surface is provided between the dental component and the reference.

4. The method according to claim 2, wherein the occlusal contact movement defines a trace surface which as a design guide when designing the dental component.

5. The method according to claim 4, wherein the trace surface is used as a cutting plane for trimming the dental component.

6. The method according to claim 4, wherein at least a part of the dental component is snapped to the trace surface.

7. The method according to claim 1, wherein digitally designing the dental restoration or the orthodontic appliance comprises using the occlusal contact movement to design the dental restoration of the orthodontic appliance.

8. A system for designing a dental restoration or an orthodontic appliance for a patient, wherein the system comprises:
   means for obtaining a 3D representation of the patient's upper jaw using an intra-oral scanner;
   means for obtaining a 3D representation of the patient's lower jaw using an intra-oral scanner;
   means for obtaining a consecutive sequence of at least a first 3D representation of a first bite configuration of the patient's jaws in a first occlusion and a second 3D representation of a second bite configuration of the patient's jaws in a second occlusion different from the first occlusion by recording an occlusal contact movement of the patient using the intra-oral scanner while the patient is moving the jaws in the occlusal contact movement;
   means for digitally obtaining an alignment sequence of the upper jaw and the lower jaw by aligning the 3D representation of the 3D representation of the upper jaw and the 3D representation of the lower jaw in the consecutive sequence by using the respective first and second 3D representations of the first and second bite configurations;
   means for digitally determining the occlusal contact movement of the patient's upper jaw and lower jaw relative to each other; and
   means for digitally designing the dental restoration or the orthodontic appliance based on the occlusal contact movement of the patient's upper jaw and lower jaw relative to each other.

* * * * *